US012696020B2

(12) United States Patent
Yang et al.

(10) Patent No.: US 12,696,020 B2
(45) Date of Patent: Jul. 28, 2026

(54) SPEAKER MODULE AND ELECTRONIC DEVICE INCLUDING THE SAME

(71) Applicant: SAMSUNG ELECTRONICS CO., LTD., Suwon-si (KR)

(72) Inventors: Seongkwan Yang, Suwon-si (KR); Changtaek Kang, Suwon-si (KR); Jonghwan Kim, Suwon-si (KR); Jaeha Park, Suwon-si (KR); Hochul Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 244 days.

(21) Appl. No.: 18/383,345

(22) Filed: Oct. 24, 2023

(65) Prior Publication Data

US 2024/0137677 A1 Apr. 25, 2024
US 2024/0236535 A9 Jul. 11, 2024

Related U.S. Application Data

(63) Continuation of application No. PCT/KR2023/016223, filed on Oct. 19, 2023.

(30) Foreign Application Priority Data

Oct. 24, 2022 (KR) ........................ 10-2022-0137197
Nov. 3, 2022 (KR) ........................ 10-2022-0145497

(51) Int. Cl.
*H04R 1/02* (2006.01)
*H01F 7/02* (2006.01)
(Continued)

(52) U.S. Cl.
CPC ........... *H04R 1/028* (2013.01); *H01F 7/0289* (2013.01); *H04R 1/105* (2013.01); *H04R 9/04* (2013.01); *H04R 2460/13* (2013.01)

(58) Field of Classification Search
CPC .......... H04R 1/028; H04R 1/105; H04R 1/24; H04R 1/403; H04R 9/04; H04R 9/025;
(Continued)

(56) References Cited

U.S. PATENT DOCUMENTS 6,349,001 B1 2/2002 Spitzer
7,231,057 B2 6/2007 Kim et al.
(Continued)

FOREIGN PATENT DOCUMENTS

CN 217486643 U 9/2022
KR 10-2006-0043936 A 5/2006
(Continued)

OTHER PUBLICATIONS

International Search Report dated Jan. 25, 2024 issued by the International Searching Authority in International Application No. PCT/KR2023/016223.
(Continued)

*Primary Examiner* — Ahmad F. Matar
*Assistant Examiner* — Sabrina Diaz
(74) *Attorney, Agent, or Firm* — Sughrue Mion, PLLC

(57) ABSTRACT

A speaker module includes a yoke plate, a first speaker including a first magnet coupled to the yoke plate, a diaphragm spaced apart from the yoke plate and a first coil coupled to the diaphragm, and a second speaker including a housing coupled to the yoke plate and on a side of the first speaker, a second coil provided in the housing and coupled to the yoke plate, and a second magnet spaced apart from the second coil in the housing and coupled to the housing.

20 Claims, 13 Drawing Sheets

(51) Int. Cl.
*H04R 1/10* (2006.01)
*H04R 9/04* (2006.01)

(58) Field of Classification Search
CPC ...... H04R 9/063; H04R 9/06; H04R 2460/13; H04R 3/08; H04R 11/02; H04R 2499/11; H01F 7/0289
USPC ......................................... 381/412, 401, 402
See application file for complete search history.

(56) References Cited

U.S. PATENT DOCUMENTS

| | | | |
|---|---|---|---|
| 10,728,649 B1 | 7/2020 | Holman | |
| 11,102,602 B1 | 8/2021 | Brimijoin et al. | |
| 11,176,925 B1 | 11/2021 | Silfvast et al. | |
| 11,350,216 B2 | 5/2022 | Tagami et al. | |
| 2011/0255715 A1 | 10/2011 | Doh et al. | |
| 2012/0020501 A1 | 1/2012 | Lee | |
| 2013/0195293 A1 | 8/2013 | Ko | |
| 2015/0341717 A1 | 11/2015 | Song et al. | |
| 2019/0104352 A1* | 4/2019 | Ozawa | H04R 1/24 |
| 2019/0342647 A1 | 11/2019 | Mehra et al. | |
| 2021/0067877 A1* | 3/2021 | Jeon | H04S 1/007 |
| 2021/0377660 A1 | 12/2021 | Zhang et al. | |
| 2022/0210532 A1 | 6/2022 | Han et al. | |
| 2022/0210570 A1 | 6/2022 | Ko et al. | |
| 2022/0248133 A1 | 8/2022 | Zhang et al. | |

FOREIGN PATENT DOCUMENTS

| | | | |
|---|---|---|---|
| KR | 10-0688794 B1 | 3/2007 | |
| KR | 20-0443212 Y1 | 1/2009 | |
| KR | 10-2010-0108871 A | 10/2010 | |
| KR | 10-1177322 B1 | 8/2012 | |
| KR | 101460170 B1 * | 11/2014 | H04R 1/24 |
| KR | 10-2015-0134666 A | 12/2015 | |
| KR | 10-1576134 B1 | 12/2015 | |
| KR | 10-2016-0014507 A | 2/2016 | |
| KR | 10-1727020 B1 | 4/2017 | |
| KR | 10-2039839 B1 | 11/2019 | |
| KR | 10-2021-0005168 A | 1/2021 | |
| KR | 10-2441707 B1 | 9/2022 | |

OTHER PUBLICATIONS

Written Opinion dated Jan. 25, 2024 issued by the International Searching Authority in International Application No. PCT/KR2023/016223.

Communication issued Sep. 16, 2025 by the European Patent Office in European Patent Application No. 23882995.6.

* cited by examiner

SPEAKER MODULE AND ELECTRONIC DEVICE INCLUDING THE SAME

CROSS-REFERENCE TO RELATED APPLICATIONS

This application is a continuation application of an International application No. PCT/KR2023/016223, filed on Oct. 19, 2023, in the Korean Intellectual Property Receiving Office, which is based on and claims priority to Korean Patent Application No. 10-2022-0145497, filed on Nov. 3, 2022, in the Korean Intellectual Property Office, and Korean Patent Application No. 10-2022-0137197, filed on Oct. 24, 2022, in the Korean Intellectual Property Office, the disclosures of which are incorporated by reference herein in their entireties.

BACKGROUND

1. Field

The disclosure relates to a speaker module in which an air conduction-type speaker and a bone conduction-type speaker are modularized, and an electronic device including the same.

2. Description of Related Art

The metaverse may be defined as a three-dimensional (3D)-based virtual world in which daily activities and economic activities are conducted through an avatar representing a user in the real world. Daily activities and economic activities may not be separated from reality, and may include behaviors that take place as an extension of reality, meaning that the real world may be combined with virtual space, as if reality is extended into virtual space.

Electronic devices are being developed that implement interfaces to provide a metaverse experience of a user's daily activities in the real world. Specifically, various services may be provided through devices such as augmented reality (AR) glasses for various physical activities related to the user's exercise.

SUMMARY

According to an aspect of the disclosure, a speaker module may include a yoke plate, a first speaker including a first magnet coupled to the yoke plate, a diaphragm spaced apart from the yoke plate and a first coil coupled to the diaphragm, and a second speaker including a housing coupled to the yoke plate and on a side of the first speaker, a second coil provided in the housing and coupled to the yoke plate, and a second magnet spaced apart from the second coil in the housing and coupled to the housing.

The first speaker and the second speaker may be provided along a first direction of the yoke plate and may at least partially overlap along the first direction.

The second speaker may be provided in a center portion of the yoke plate and at least one of the first magnet, the diaphragm, and the first coil may at least partially surround the second speaker.

In the second speaker, at least one of the housing, the second coil and the second magnet may have a ring-shape in a cross-sectional view, in the first speaker, at least one of the first magnet, the diaphragm, and the first coil may have a ring-shape in a cross-sectional view, and the at least one of the housing, the second coil and the second magnet may be concentric with the at least one of the first magnet, the diaphragm, and the first coil.

The first magnet and the first coil may be provided between the diaphragm and the yoke plate.

The second coil and the second magnet may be provided between the yoke plate and the housing.

The diaphragm may extend in a planar direction such that at least a portion of the diaphragm overlaps the housing and an end of the diaphragm may be coupled to the housing.

The second magnet may be coupled to the housing by an elastically deformable connection member.

The diaphragm may be coupled to an outer surface of the housing and the housing may include a metal material and may be configured to transfer a vibration of the diaphragm to the yoke plate.

The first speaker may include an air conduction speaker that is configured to emit a sound to an outside by transferring a vibration of the diaphragm.

The second speaker may include a bone conduction speaker that is configured to transfer a vibration to a user that contacts the yoke plate.

The first speaker may be configured to generate a sound corresponding to a first sound range and the second speaker may be configured to generate a vibration corresponding to a second sound range that is at least partially lower than the first sound range.

According to an aspect of the disclosure, an electronic device may include a first speaker configured to emit a sound to an outside through a vibration of a diaphragm spaced apart from a yoke plate, a second speaker configured to transfer a vibration to a user through the yoke plate that contacts the user and at least one processor configured to control the first speaker to generate a sound corresponding to a first sound range and control the second speaker to generate a vibration corresponding to a second sound range that is at least partially lower than the first sound range.

The at least one processor may be further configured to filter an audio signal obtained from an outside into the first sound range and the second sound range, transmit the audio signal filtered into the first sound range to the first speaker and transmit the audio signal filtered into the second sound range to the second speaker.

The first speaker and the second speaker may be provided along a first direction of the yoke plate and may at least partially overlap along the first direction of the yoke plate.

The second speaker may be provided in a center portion of the yoke plate, and the first speaker may at least partially surround the second speaker.

The first speaker may include a first magnet coupled to the yoke plate, and first coil coupled to the diaphragm, where the first magnet and the first coil may be provided between the diaphragm and the yoke plate, the second speaker may include a housing coupled to the yoke plate on a side of the first speaker, a second coil coupled to the yoke plate and a second magnet spaced apart from the second coil in the housing and coupled to the housing, and the second coil and the second magnet may be provided between the yoke plate and the housing.

In the second speaker, at least one of the housing, the second coil an the second magnet may have a ring-shape in a cross-sectional view, in the first speaker, at least one the first magnet, the diaphragm, and the first coil may have a ring-shape in a cross-section view, and the at least one of the housing, the second coil and the second magnet may be concentric with the at least one of the first magnet, the diaphragm, and the first coil.

The diaphragm may extend in a planar direction such that at least a portion of the diaphragm overlaps the housing, an end of the diaphragm may be coupled to the housing and the second magnet may be coupled to the housing by an elastically deformable connection member.

The electronic device may be a wearable device configured to be worn on a head of the user with the yoke plate contacting the head of the user.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
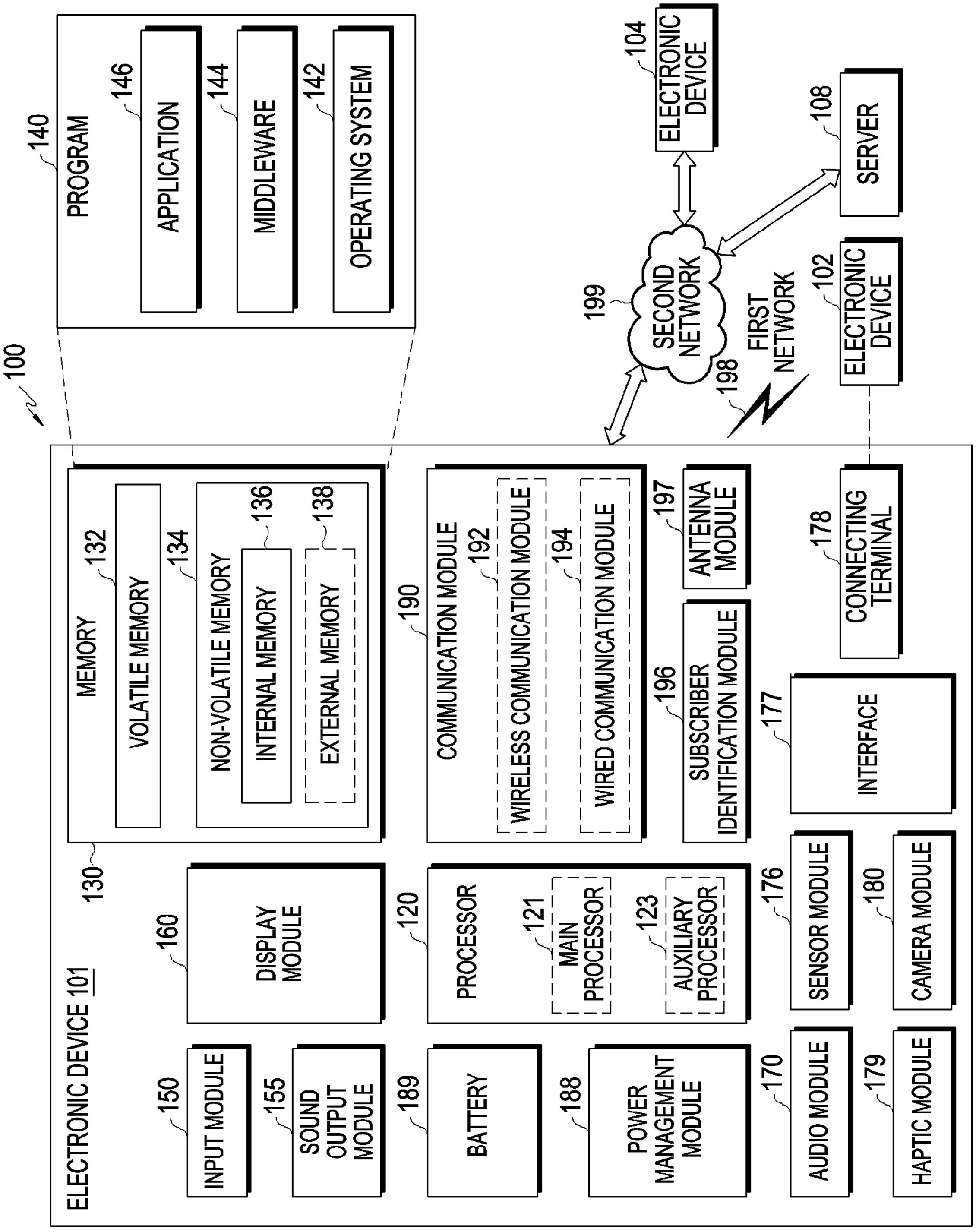
FIG. 1 is a block diagram illustrating an electronic device in a network environment according to an embodiment of the disclosure.

Embodiments of the present disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

As described herein, various assembly actions are used interchangeably, such as fixed, coupled, fixedly coupled, directly coupled, etc., and such assembly actions do not specifically exclude other types of assembly actions that may result in a similar structure or form. One of ordinary skill in the art will understand from the disclosure herein that such assembly actions are not specifically limited by the ordinary definitions of these terms, and that other such assembly actions may be utilized to construct the devices disclosed herein.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™ wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to an embodiment may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

Figure 2:
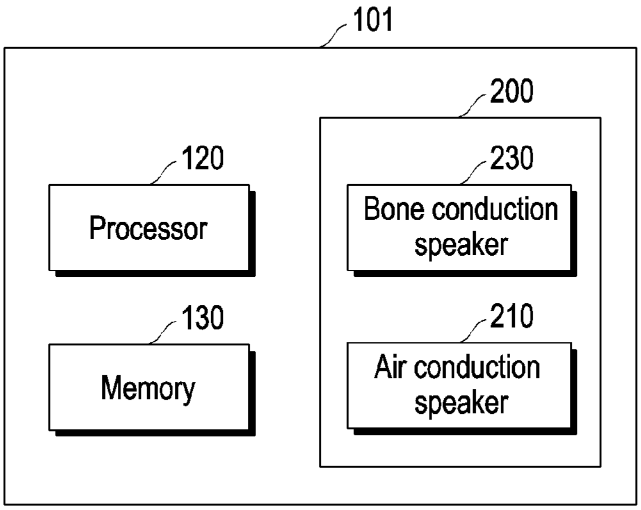
FIG. 2 is a block diagram illustrating a configuration of an electronic device according to an embodiment of the disclosure.

FIG. 2 is a block diagram illustrating a configuration of an electronic device 101 according to an embodiment of the disclosure.

For example, the electronic device 101 may include at least some or all of the components of the electronic device 101 as described above with reference to FIG. 1.

The electronic device 101 according to an embodiment may include a processor 120, a memory 130, and/or a speaker module 200 (e.g., the audio module 170 of FIG. 1). In an embodiment, the speaker module 200 may include an air conduction speaker 210 and/or a bone conduction speaker 230.

The processor 120 according to an embodiment may control at least one other component connected to the processor 120 based on execution of software (e.g., the program 140 of FIG. 1) or an application (e.g., the application 146 of FIG. 1). In an embodiment, the processor 120 may execute a command stored in the memory 130 or may perform various data processing or operations.

In an embodiment, the speaker module 200 may be one in which the air conduction speaker 210 and the bone conduction speaker 230 are integrally modularized. In an embodiment, the speaker module 200 may be disposed in the electronic device 101, and at least one speaker module 200 may be disposed to be spaced apart from the user wearing the electronic device 101 in the upper and lower directions, the left and right directions, or the front and rear directions.

The air conduction speaker 210 according to an embodiment may emit air vibration (e.g., sound) to the outside of the electronic device 101 through the diaphragm, and the emitted air vibration may be transferred to the cochlea of the user through the eardrum of the user.

The bone conduction speaker 230 according to an embodiment may contact a designated position (e.g., temple) of the user to generate vibration, and the generated vibration may be transferred to the cochlea of the user through the skull.

A detailed configuration of the air conduction speaker 210 and the bone conduction speaker 230 according to an embodiment is described below.

Figure 3A:
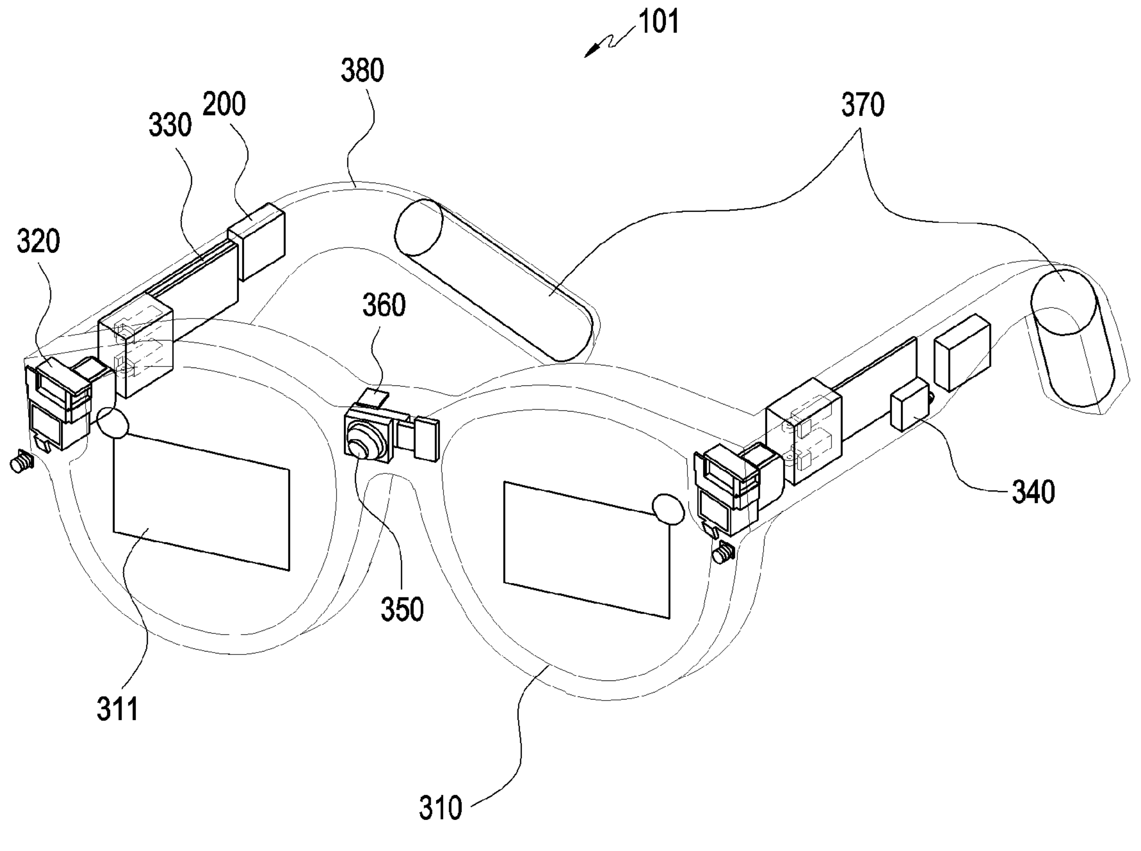
FIG. 3A is a front perspective view illustrating an electronic device according to an embodiment of the disclosure.
Figure 3B:
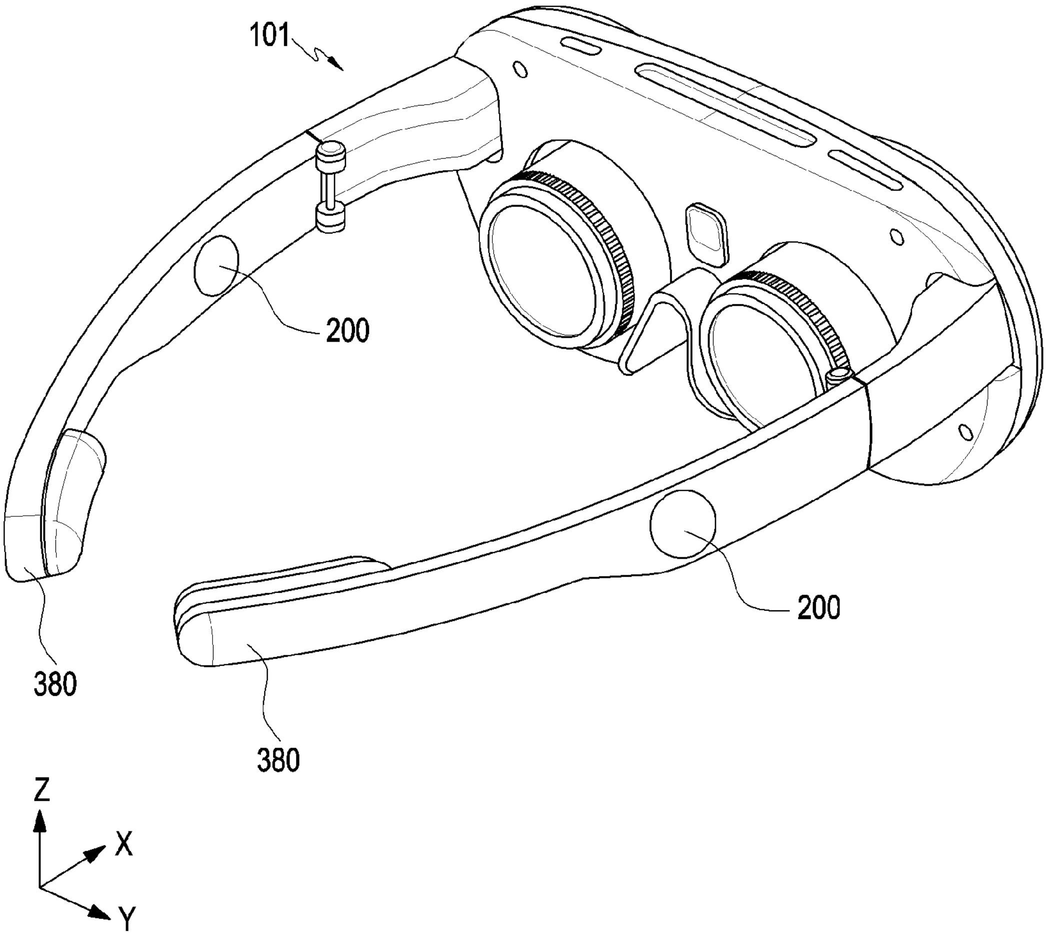
FIG. 3B is a rear perspective view illustrating an electronic device according to an embodiment of the disclosure.

FIG. 3A is a front perspective view illustrating an electronic device 101 according to an embodiment of the disclosure. FIG. 3B is a rear perspective view illustrating an electronic device 101 according to an embodiment of the disclosure.

Referring to FIGS. 3A and 3B, an electronic device 101 according to an embodiment may be an augmented reality (AR) device (e.g., AR glasses, video see-through (VST) optical see-through (OST)) that displays an AR screen to the user wearing it, a virtual reality (VR) device that displays a VR screen to the user wearing it, or a head mounted device that is worn on the wearer's head, such as glasses, headsets, or goggles, and displays a two-dimensional (2D) or three-dimensional (3D) virtual graphic object, sound, or vibration within the user's field of view.

The electronic device 101 may provide the user with various types of exercise guides of an exercise time, an average speed, and/or an exercise distance.

The electronic device 101 according to an embodiment may include a transparent or translucent lens 310 positioned in front of the user's field of view, a display 320 displaying a screen 311 in the field of view of the user wearing the electronic device 101, a speaker module 200, a circuit board 330, a sensor circuit 340, a camera 350, a microphone 360, and/or a battery 370.

In an embodiment, the electronic device 101 may use a VST scheme in which a video or an image through a liquid crystal display (LCD), an organic light-emitting diode (LED) (OLED), or a micro LED (nLED) is displayed in front of the user's field of view, and may be recognized by the user through the lens 310 or may be recognized by the user through OLED on silicon (OLEDoS) capable of ultra-high resolution integration.

In an embodiment, the electronic device 101 may use an OST scheme that augments an image on the lens 310 that is transparent like glasses using the display 320 of a liquid crystal on silicon (LCoS) and LED on silicon (LEDoS) type. The image may be combined with the image transferred through a waveguide through a combiner and displayed on the display 320.

The lens 310 according to an embodiment of the disclosure may be positioned in front of the user's field of view and may be transparent or translucent to transmit light radiated or reflected from the surroundings. The user may recognize the image of the surroundings through the lens 310.

The display 320 according to an embodiment may display the screen of the display 320 to the user based on the display data received from the processor 120. In an embodiment, the display 320 may display a screen directly to the user while being positioned in the user's field of view, or may display a screen in an AR manner on a screen display part formed in the whole or part of the transparent or translucent lens 310 positioned in the user's field of view.

The speaker module 200 according to an embodiment may be an output device that provides a voice or sound to a user. For example, the speaker module 200 may be disposed to tightly (e.g., closely)_contact the skin such that vibration is transferred through the user's bone from the support 380 of the electronic device 101, which is in the form of glasses seated on the user's ear. According to an embodiment, at least two or more speaker modules 200 may be provided, and the supports 380 may be disposed in areas closely contacting the skin on two opposite sides of the user in the left and right directions, and may be disposed on the user's two opposite sides, respectively.

In an embodiment, the support 380 may extend to surround or at least partially surround the user's head while the electronic device 101 is worn on the user's head, and when the electronic device 101 is worn on the user's head, the support 380 may tightly contact the user's skin at a designated position adjacent to the user's ear.

The circuit board 330 according to an embodiment may include at least one circuit and may be disposed on the support 380. In an embodiment, the circuit board 330 may be provided with components such as a processor (e.g., the processor 120 of FIG. 2) and/or a memory (e.g., the memory 130 of FIG. 2).

The sensor circuit 340 according to an embodiment may be disposed on the support 380 to contact the user's skin while the user wears the electronic device 101. The sensor circuit 340 may detect biometric data (e.g., heart rate, blood pressure, and breath) of the user.

The camera 350 according to an embodiment may be an input device that obtains a video or an image for the user's field of view or a video or an image for the user's surroundings. In an embodiment, the camera 350 may be disposed to face the user's field of view in the electronic device 101, or may be disposed on each of two opposite sides in the left and right directions to correspond to the user's eyeballs. According to an embodiment, a plurality of cameras 350 may be provided which may be wide-angle cameras for photographing partial areas in front of the electronic device 101 or stereo cameras capable of photographing a whole area in front of the electronic device 101.

The microphone 360 according to an embodiment may be an input device that obtains a voice input around the user or a voice generated from the user. For example, the microphone 360 may be disposed in a direction facing the user's field of view, or may be disposed on each of two opposite sides of the user in the left and right directions. In an embodiment, the electronic device 101 may obtain a sound input around the user or a voice generated from the user through the microphone 360 and may store the same in the memory 130.

The battery 370 according to an embodiment may store charged power and supply power to each component included in the electronic device 101 through discharge. In an embodiment, the battery 370 may be disposed in the support 380.

Figure 4A:
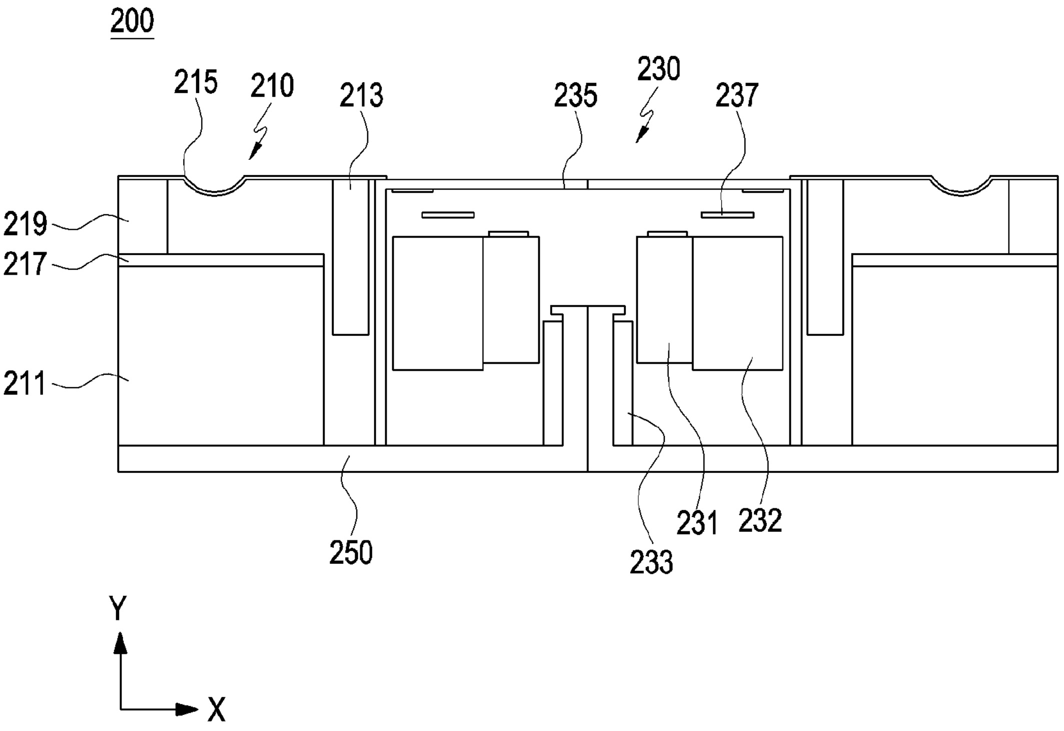
FIG. 4A is a cross-sectional view illustrating a speaker module according to an embodiment of the disclosure.
Figure 4B:
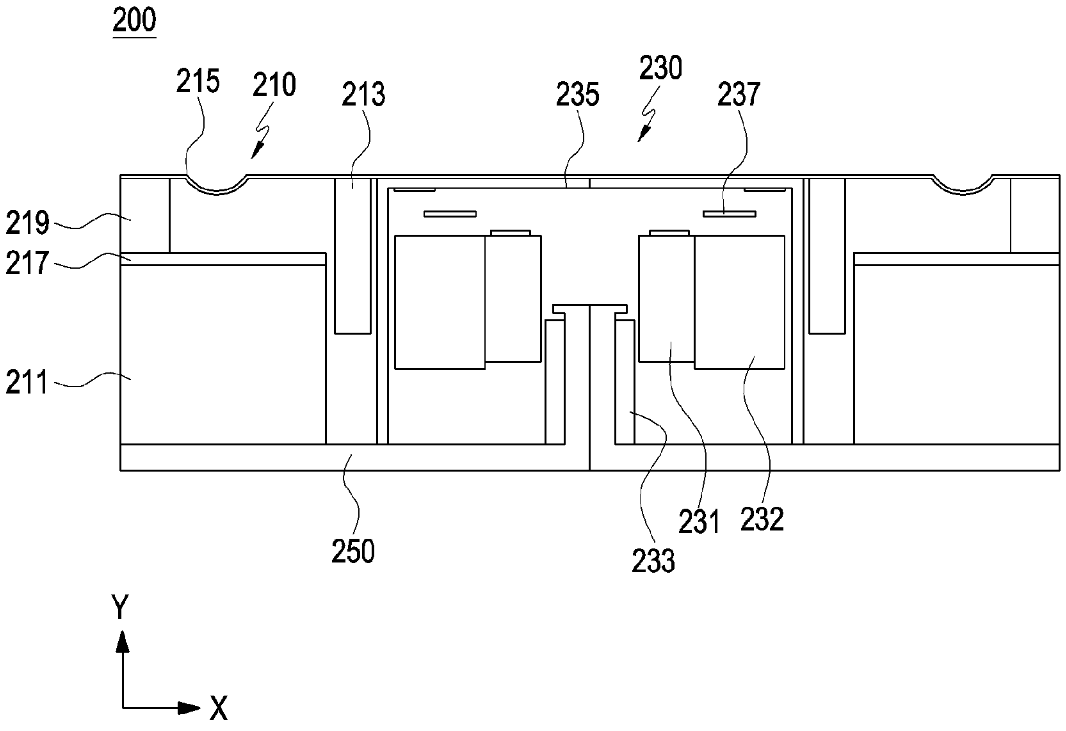
FIG. 4B is a cross-sectional view illustrating a speaker module according to an embodiment of the disclosure.
Figure 5:
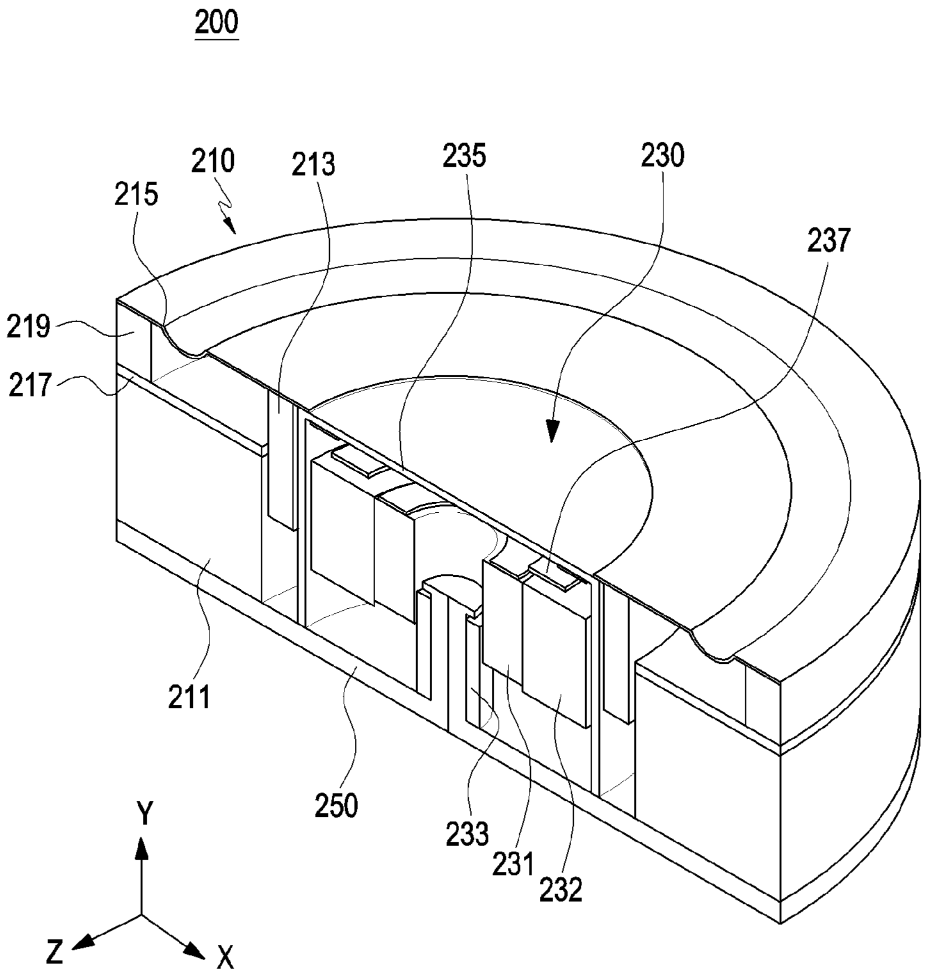
FIG. 5 is a cross-sectional perspective view illustrating a speaker module according to an embodiment of the disclosure.
Figure 6:
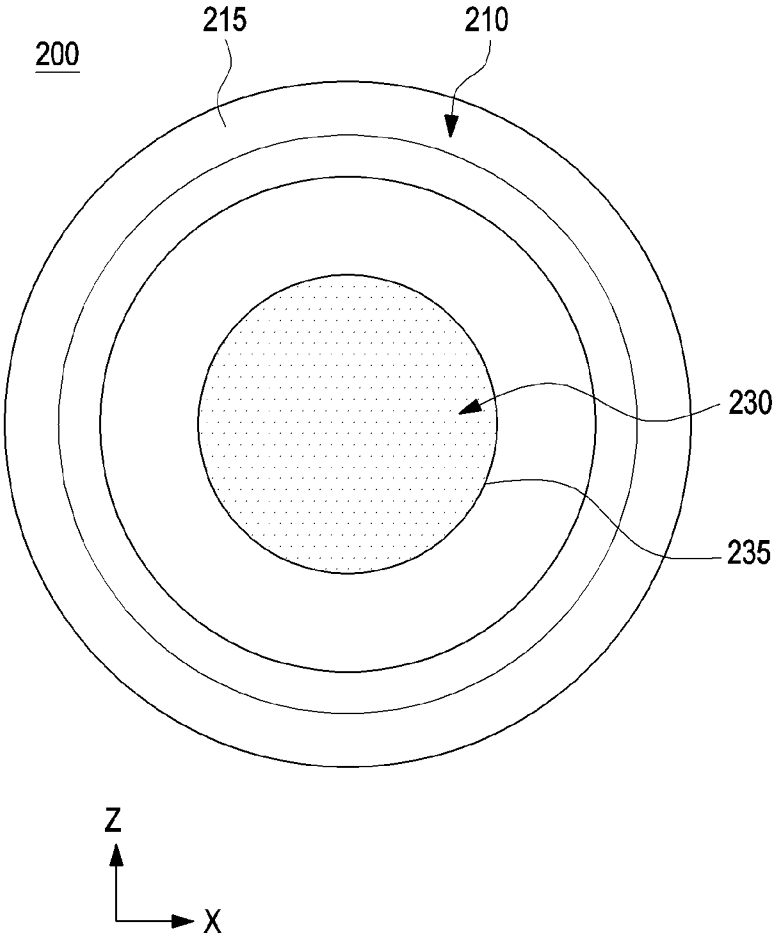
FIG. 6 is a top view illustrating a speaker module according to an embodiment of the disclosure.

FIG. 4A is a cross-sectional view illustrating a speaker module 200 according to an embodiment of the disclosure. FIG. 4B is a cross-sectional view illustrating a speaker module according to an embodiment of the disclosure. FIG. 5 is a cross-sectional perspective view illustrating a speaker module 200 according to an embodiment of the disclosure. FIG. 6 is a top view illustrating a speaker module 200 according to an embodiment of the disclosure.

Referring to FIGS. 4A, 4B, 5, and 6, a speaker module 200 according to an embodiment may include an air conduction speaker 210 and a bone conduction speaker 230 sharing the yoke plate 250. The speaker module 200 may be disposed at a specified position of a support (e.g., the support 380 of FIGS. 3A and 3B) of the electronic device 101 extending in the front and rear directions to surround or at least partially surround the user's head.

In an embodiment, the yoke plate 250 may be shared by the air conduction speaker 210 and the bone conduction speaker 230, and may partition the inner space of the air conduction speaker 210 while simultaneously partitioning the inner space of the bone conduction speaker 230. In an embodiment, the yoke plate 250 may be disposed inward of the support 380 to be positioned adjacent to the skin of the user wearing the electronic device 101.

In an embodiment, the yoke plate 250 may serve as a vibrator that fixes the first magnet 211 of the air conduction speaker 210 while contacting the user of the speaker module 200. In an embodiment, the air conduction speaker 210 may emit sound in one direction of the yoke plate 250 through the diaphragm 215 disposed to be spaced apart from the yoke plate 250 in one direction, and the bone conduction speaker 230 may contact the user's skin through the other side surface of the yoke plate 250 to transfer vibration.

In an embodiment, the air conduction speaker 210 may include a first magnet 211 fixed to the yoke plate 250, a diaphragm 215 disposed to be spaced apart from the yoke plate 250, and/or a first coil 213 fixed to the diaphragm 215.

In an embodiment, the first magnet 211 may be positioned on one side surface of the yoke plate 250 and may be fixedly coupled to the yoke plate 250. For example, the first magnet 211 may be fixed to the yoke plate 250 by a fixing plate 217 spaced apart from the yoke plate 250 in one direction to prevent the first magnet 211 from moving.

In an embodiment, the diaphragm 215 may be spaced apart from the yoke plate 250 in one direction to partition the inner space of the air conduction speaker 210, and the first magnet 211 and/or the first coil 213 may be disposed in the inner space. For example, the diaphragm 215 may be coupled to the column 219 coupled to the fixing plate 217 and may be supported in a state of being spaced apart from the yoke plate 250 and the first magnet 211 in one direction.

In the embodiment illustrated in FIG. 4A, the diaphragm 215 may have a hollow shape having a passed-through central portion, an outer end thereof may be coupled to the column 219, and an inner end thereof may be coupled to a housing 235 of the bone conduction speaker 230 to be described below.

In an embodiment illustrated in FIG. 4B, the diaphragm 215 may extend in a planar direction, and an outer end thereof may be coupled to the column 219. In an embodiment, the diaphragm 215 may extend inward to cover or at least partially cover the upper portion of the housing 235 of the bone conduction speaker 230. For example, the upper portion of the housing 235 may be completely covered such that the housing 235 of the bone conduction speaker 230 is not exposed to the outside.

In an embodiment, the housing 235 may be formed of a metal-based material (e.g., the housing 235 may include a metal-based material) to easily transfer the vibration of the diaphragm 215 to the yoke plate 250.

In an embodiment, the diaphragm 215 may be disposed to be spaced apart from the yoke plate 250 and may be disposed to at least partially face the yoke plate 250 to linearly reciprocate in a direction toward or away from the yoke plate 250.

In an embodiment, the first magnet 211 may be disposed on the yoke plate 250, the first coil 213 may be disposed on the diaphragm 215, and the first magnet 211 and the first coil 213 may be positioned to be deviated from each other in a direction in which the yoke plate 250 and the diaphragm 215 are spaced apart from each other such that a position deviation occurs at least partially.

In an embodiment, the first coil 213 may be fixedly coupled to the diaphragm 215, and the diaphragm 215 may generate vibration by moving the first coil 213. In an embodiment, the first coil 213 may cause a movement along one direction of the yoke plate 250 by the magnetic field generated by the first magnet 211 and a change in current in the first coil 213, vibrating the diaphragm 215 fixedly coupled and hence emitting sound (e.g., sound or voice) in the air.

In an embodiment, the bone conduction speaker 230 may include a housing 235 coupled to the yoke plate 250 on a side of the air conduction speaker 210, a second coil 233 positioned in the housing 235 and fixed to the yoke plate 250, and a second magnet 231 positioned to be spaced apart from the second coil 233 in the housing 235 and coupled to the housing 235.

In an embodiment, the bone conduction speaker 230 may be formed on one side of the yoke plate 250 and may be disposed on the side of the air conduction speaker 210. For example, the yoke plate 250 may simultaneously partition the air conduction speaker 210 and the bone conduction speaker 230. In an embodiment, the second coil 233 and/or the second magnet 231 may be disposed in a space partitioned between the yoke plate 250 and the housing 235.

In an embodiment, the housing 235 may include a side surface extending in one direction from the yoke plate 250 and one surface extending in a planar direction from an end portion of the side surface. In an embodiment, the housing 235 may be formed of a metal material, and one surface thereof may be connected to an end portion of the diaphragm 215, and an end portion of the side surface thereof may be connected to the yoke plate 250 to transmit vibration of the diaphragm 215 to the yoke plate 250.

In an embodiment, the air conduction speaker 210 and the bone conduction speaker 230 may be positioned in one direction of the yoke plate 250, and at least portions of the air conduction speaker 210 and the bone conduction speaker 230 may overlap in the one direction of the yoke plate 250. Accordingly, the space in which the air conduction speaker 210 and the bone conduction speaker 230 are disposed may be reduced, and the difference between their relative positions may be removed, thereby removing the acoustic effect according to the position difference.

In an embodiment, the bone conduction speaker 230 may be positioned in a central portion of the yoke plate 250, and the air conduction speaker 210 may have a shape surrounding or at least partially surrounding the bone conduction speaker 230 from the outside. In an embodiment, the bone conduction speaker 230 in which the inner space is partitioned by the housing 235 may be shaped to have sides surrounded or at least partially surrounded by the first magnet 211 and/or the first coil 213 and to have one side surrounded or at least partially surrounded by the diaphragm 215.

In an embodiment, the housing 235, the second coil 233, and/or the second magnet 231 partitioning the inner space of the bone conduction speaker 230 may have a ring-shaped cross section, and the cross section of the first magnet 211, the first coil 213, and/or the diaphragm 215 of the air conduction speaker 210 may have a ring shape surrounding or at least partially surrounding the housing 235, the second coil 233, and/or the second magnet 231 of the bone conduction speaker 230 from the outside. In an embodiment, the cross sections of the first magnet 211, the first coil 213, and/or the diaphragm 215 of the air conduction speaker 210 may be concentric with the housing 235, the second coil 233, and/or the second magnet 231 of the bone conduction speaker 230.

In an embodiment, the second coil 233 may be fixedly coupled to the yoke plate 250 on one side of the yoke plate 250. The second coil 233 may vibrate due to a change in current in the second coil 233 and the magnetic field of the second magnet 231.

In an embodiment, the second magnet 231 may be coupled to the housing 235, and the second magnet 231 may be coupled to the housing 235 to be movable relative to the housing 235. In an embodiment, the electronic device may be coupled to the housing 235 (e.g., one surface of the housing 235) through an elastically deformable connection member 237 and may thus vibrate separately from the vibration of the housing 235 or may be fixed with the vibration of the housing 235 blocked.

In an embodiment, the second magnet 231 may be formed to have a designated mass or more, or may be coupled with an additional mass 232. Accordingly, the movement and/or vibration of the second magnet 231 may be minimized.

Figure 7:
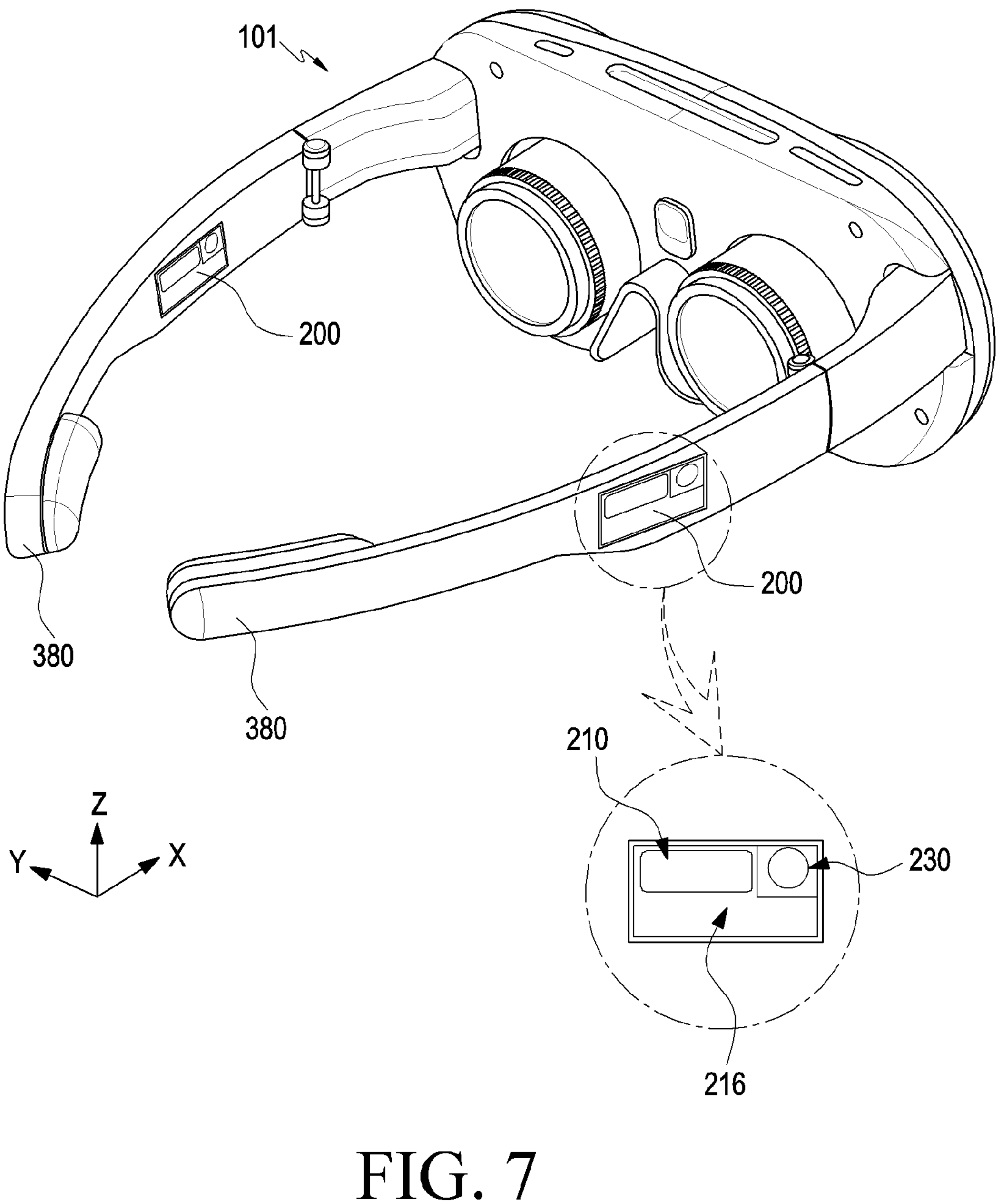
FIG. 7 is a rear perspective view illustrating an electronic device according to an embodiment of the disclosure.
Figure 8:
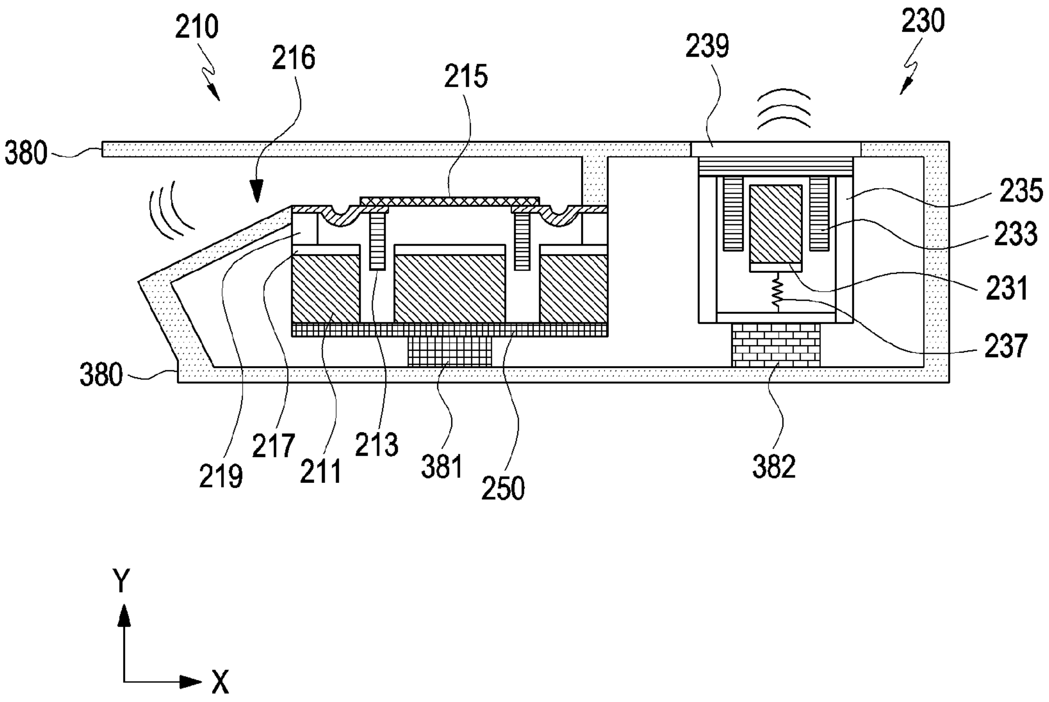
FIG. 8 is a cross-sectional view illustrating an electronic device according to an embodiment of the disclosure.

FIG. 7 is a rear perspective view illustrating an electronic device 101 according to an embodiment of the disclosure. FIG. 8 is a cross-sectional view illustrating an electronic device 101 according to an embodiment of the disclosure.

Referring further to FIGS. 7 to 8, the air conduction speaker 210 and the bone conduction speaker 230 included in the speaker module 200 of the electronic device 101 according to an embodiment may be positioned side by side. In an embodiment, the speaker module 200 may be disposed in a support (e.g., the support 380 of FIGS. 3A and 3B) of the electronic device 101 extending in the front and rear directions to surround or at least partially surround the user's head, and the air conduction speaker 210 and the bone conduction speaker 230 may be disposed to be spaced apart from each other in the front and rear directions in which the support 380 extends. In an embodiment, the air conduction speaker 210 and the bone conduction speaker 230 may at least partially overlap in the thickness direction of the support 380. Accordingly, the space in which the air conduction speaker 210 and the bone conduction speaker 230 are disposed may be reduced.

In an embodiment, the air conduction speaker 210 may be disposed at a designated position of the support 380, and may emit the sound generated by vibration of the diaphragm 215 through a wave guide 216 extending forward or backward. In an embodiment, the wave guide 216 may be formed behind the air conduction speaker, and the bone conduction speaker 230 together with the wave guide 216 may be disposed in the rear space of the air conduction speaker, thereby reducing the arrangement space.

In an embodiment, the wave guide 216 may form a path for guiding a sound (e.g., sound or voice) generated through the diaphragm 215 in a designated direction to be emitted to the outside. In an embodiment, the sound generated from the air conduction speaker 210 may be emitted outward of the user wearing the electronic device 101 through the wave guide 216.

In an embodiment, the bone conduction speaker 230 may be disposed in the front or rear of the air conduction speaker 210 in the front and rear directions in which the support 380 extends. In an embodiment, the bone conduction speaker 230 may at least partially overlap the air conduction speaker 210 and/or the wave guide in the thickness direction of the support 380.

In an embodiment, the air conduction speaker 210 may include a yoke plate 250, a first magnet 211 fixed to the yoke plate 250, a diaphragm 215 disposed to be spaced apart from the yoke plate 250, and/or a first coil 213 fixed to the diaphragm 215.

In an embodiment, the yoke plate 250 may be directly coupled to the support 380 or may be fixedly coupled to the support 380 through a first sound absorbing material 381. In an embodiment, the diaphragm 215 may have an outer end fixedly coupled to the column 219, and may be supported in a state of being spaced apart from the yoke plate 250 by the fixing plate 217 and/or the column 219.

In an embodiment, the first magnet 211 may be fixedly coupled to the yoke plate 250 and may be inserted into a space partitioned between the yoke plate 250 and the fixing plate 217. Thus, the first magnet 211 may be supported by the yoke plate 250 and the fixing plate 217 to prevent movement.

In an embodiment, the first coil 213 may be fixedly coupled to the diaphragm 215, and may be disposed to at least partially overlap the first magnet 211 or to be at least partially spaced apart from the first magnet 211.

In an embodiment, the bone conduction speaker 230 may include a housing 235 fixed to the support 380, a second magnet 231 coupled to the housing 235 through an elastically deformable connection member 237 inside the housing 235, a contact surface 239 contacting the user's skin, and/or a second coil 233 fixed to the contact surface 239.

In an embodiment, the housing 235 may be directly coupled to the support 380 or may be fixedly coupled to the support 380 through a second sound absorbing material 382. In an embodiment, the housing 235 may be shaped to be open to one side while partitioning the inner space, and the open side may be covered or at least partially covered by the contact surface 239. In an embodiment, the contact surface 239 may be formed of a soft material to reduce the impedance difference from the user's skin, and may be formed of, for example, rubber or flexible plastic. In an embodiment, the housing 235 and/or the support 380 may be formed by injection molding of a plastic material, and the contact surface 239 may be formed by double injection molding on one open side of the housing 235, or may be coupled to the housing 235 by bonding.

In an embodiment, the second magnet 231 may be coupled to the housing 235 through the elastically deformable connection member 237, such that the attenuated vibration may be transferred from the housing 235. The second coil 233 may be fixedly coupled to the contact surface 239, and may transfer vibration generated by a change in internal current and a magnetic field of the second magnet 231 to the contact surface 239.

Figure 9:
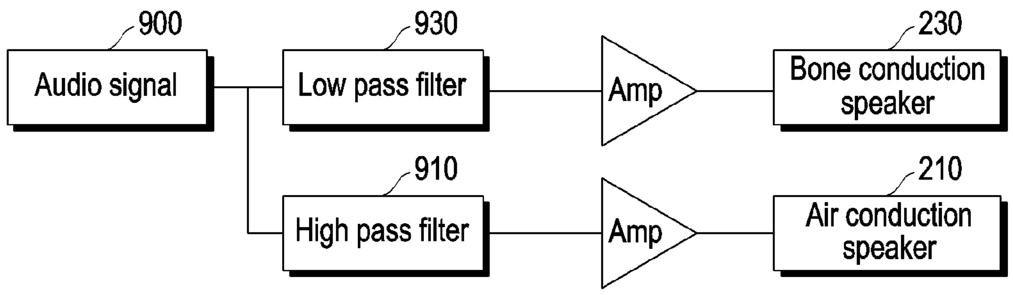
FIG. 9 is a diagram illustrating an operation of an electronic device according to an embodiment of the disclosure.

FIG. 9 is a diagram illustrating an operation of an electronic device according to an embodiment of the disclosure.

Referring to FIG. 9, an electronic device (e.g., the electronic device 101 and/or the processor 120 of FIG. 2) may operate the air conduction speaker 210 to generate a sound corresponding to a first sound range. Further, the electronic device may operate the bone conduction speaker 230 to generate vibration corresponding to a second sound range, which is at least partially lower than the first sound range.

In an embodiment, the electronic device may obtain an audio signal 900 from the outside. For example, the electronic device may obtain the audio signal 900 through an input module (e.g., the input module 150 of FIG. 1) or a microphone (e.g., the microphone 360 of FIG. 3). Alternatively, the electronic device may obtain the audio signal 900 from the outside through an interface (e.g., the interface 177 of FIG. 1) or a communication module (e.g., the communication module 190 of FIG. 1).

In an embodiment, the electronic device may control the air conduction speaker 210 to generate a sound corresponding to the first sound range, based on the obtained audio signal 900. Further, the electronic device may control the bone conduction speaker 230 to generate a vibration corresponding to the second sound range based on the obtained audio signal 900. In an embodiment, the first range may be a sound range corresponding to an intermediate range and/or a high range of sound, and the second range may be a range corresponding to a low range of sound. Accordingly, instead of the bone conduction speaker 230 having a limitation on the sound performance of the high range, the air conduction speaker 210 may generate a high-range sound. Further, by utilizing the bone conduction speaker 230, sound interference caused by noise or sound radiation to the surrounding environment may be minimized, and thus privacy may be protected.

In an embodiment, the electronic device may configure at least one channel based on the obtained audio signal 900 and transmit the at least one channel to the air conduction speaker 210 and/or the bone conduction speaker 230, respectively, thereby generating a stereo sound effect or a surround sound effect.

In an embodiment, the electronic device may filter the obtained audio signal 900 into a first sound range and a second sound range, respectively. By passing the obtained audio signal 900 through the high pass filter 910, the electronic device may filter the obtained audio signal 900 into an audio signal of a relatively high sound range and transmit the filtered audio signal to the air conduction speaker 210. Further, by passing the obtained audio signal 900 through the low pass filter 930, the electronic device may filter the obtained audio signal 900 into an audio signal of a relatively low sound range and transmit the filtered audio signal to the bone conduction speaker 230. In an embodiment, the electronic device may amplify the filtered audio signals of the high sound range and/or the low sound range and transmit the amplified audio signals to the air conduction speaker 210 or the bone conduction speaker 230, respectively.

Figure 10:
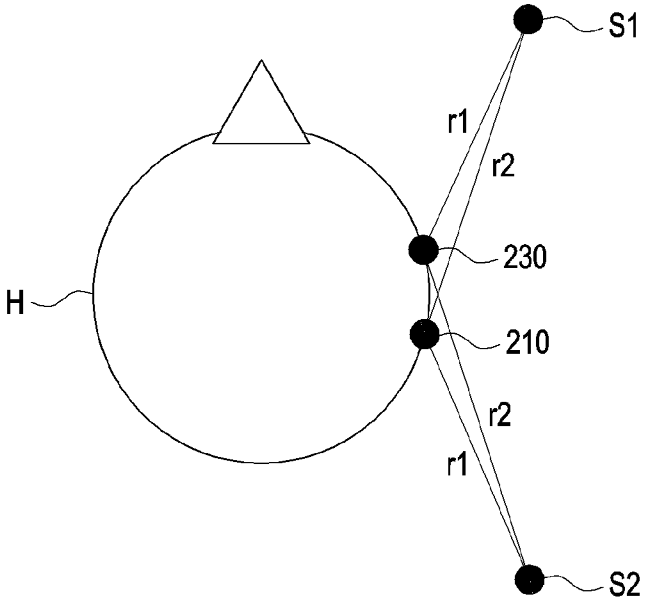
FIG. 10 is a diagram illustrating positions of the head of a user wearing an electronic device and sound sources generating sound according to an embodiment of the disclosure.
Figure 11:
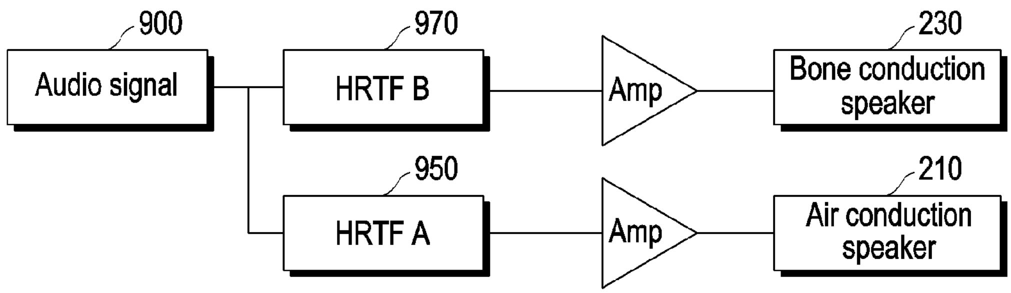
FIG. 11 is a diagram illustrating an operation of an electronic device according to an embodiment of the disclosure.

FIG. 10 is a diagram illustrating positions of the head H of a user wearing an electronic device and sound sources S1 and S2 generating sound according to an embodiment of the disclosure. FIG. 11 is a diagram illustrating an operation of an electronic device according to an embodiment of the disclosure.

Referring to FIGS. 10 and 11, in an embodiment, the electronic device (e.g., the electronic device 101 and/or the processor 120 of FIG. 2) may apply different head-related transfer functions (HRTFs) to the obtained audio signals 900, respectively, and may transfer the same to the air conduction speaker 210 and the bone conduction speaker 230.

In an embodiment, the sensitivity of the sound perceived by the human may be different depending on the positions (elevation, azimuth) of the sound sources S1 and S2. Humans may recognize the position of the sound source according to the sensitivity profile according to the experience. As an embodiment, humans may recognize sounds generated from sound sources S1 and S2 at different positions as different from each other.

In an embodiment, the HRTF may be defined as a transfer function of the sound transmitted from the sound sources S1 and S2 to the user's ear. The HRTF includes a characteristic in which a sound is transferred by the geometric shape from the sound source to the ear canal inlet and surface reflection characteristic, and is a factor to be considered in order to naturally reproduce the sound perceived by the user.

In an embodiment, the electronic device may generate a sound in the speaker module by applying an HRTF, thereby implementing a spatial audio function that applies such an effect as if a sound source generates a sound at a specific position.

In an embodiment, when the same sound is output from the air conduction speaker 210 and the bone conduction speaker 230, the user may recognize that the sound is output from different sound sources S1 and S2 as the positions at which the sound is input to the user are different.

For example, when the air conduction speaker 210 and the bone conduction speaker 230 are disposed at positions spaced apart from each other in the front and rear directions while the user wears the electronic device 101 on the head H, the user may recognize that the distances r1 and r2 from the sound sources S1 and S2 where the input sound (e.g., audio signal 900) is generated are different due to the separation distance between the air conduction speaker 210 and the bone conduction speaker 230. In other words, front-back confusing of the input sound (e.g., audio signal 900) input to the user may occur.

In an embodiment, the electronic device may apply the HRTF to the input sound (e.g., audio signal 900) such that the user may recognize the positions of the sound sources S1 and S2 in the front and rear directions. In an embodiment, the electronic device may process the signal by the HRTF A (front or back) 950 and the HRTF B (front or back) 970 that apply the HRTF to the input sound (e.g., audio signal 900) and may transfer the processed signal to the air conduction speaker 210 and the bone conduction speaker 230, respectively.

In an embodiment, the HRTF A 950 may apply the HRTF for the air conduction speaker 210 positioned relatively to the rear (in another embodiment, relatively to the front), amplify the corresponding signal, and transfer the amplified signal to the air conduction speaker 210.

In an embodiment, the HRTF B 970 may apply the HRTF for the bone conduction speaker 230 positioned relatively to the front (in another embodiment, relatively to the rear), amplify the corresponding signal, and transfer the amplified signal to the bone conduction speaker 230.

A speaker module 170 or 200 according to an embodiment of the disclosure may include a yoke plate 250. The speaker module 170 or 200 according to an embodiment of the disclosure may include a first speaker 210 including a first magnet 211 fixed to the yoke plate 250, a diaphragm 215 disposed to be spaced apart from the yoke plate 250, and a first coil 213 fixed to the diaphragm 215. The speaker module 170 or 200 according to an embodiment of the disclosure may include a second speaker 230 including a housing 235 coupled to the yoke plate 250 on a side of the first speaker 210, a second coil 233 positioned in the housing 235 and fixed to the yoke plate 250, and a second magnet 231 positioned to be spaced apart from the second coil 233 in the housing 235 and coupled to the housing 235.

In the speaker module 170 or 200 according to an embodiment of the disclosure, the first speaker 210 and the second speaker 230 are positioned in a first direction of the yoke plate 250 and at least partially overlap along the first direction of the yoke plate 250.

In the speaker module 170 or 200 according to an embodiment of the disclosure, the second speaker 230 may be positioned in a center portion of the yoke plate 250. In the speaker module 170 or 200 according to an embodiment of the disclosure, at least one of the first magnet 211, the diaphragm 215, or the first coil 213 surrounds or at least partially surrounds the second speaker 230.

In the speaker module 170 or 200 according to an embodiment of the disclosure, in the second speaker 230, a cross section of at least one of the housing 235, the second coil 233 or the second magnet 231 may have a ring-shape. In the speaker module 170 or 200 according to an embodiment of the disclosure, in the first speaker 210, a cross section of at least one of the first magnet 211, the diaphragm 215, or the first coil 213 may have a ring-shaped. In the speaker module 170 or 200 according to an embodiment of the disclosure, the at least one of the housing 235, the second coil 233 or the second magnet 231 is positioned concentric with the at least one of the first magnet 211, the diaphragm 215, or the first coil 213.

In the speaker module 170 or 200 according to an embodiment of the disclosure, the first speaker 210 may include the first magnet 211 and the first coil 213 disposed between the diaphragm 215 and the yoke plate 250.

In the speaker module 170 or 200 according to an embodiment of the disclosure, the second speaker 230 may include the second coil 233 and the second magnet 231 disposed between the yoke plate 250 and the housing 235.

In the speaker module 170 or 200 according to an embodiment of the disclosure, the diaphragm 215 may extend in a planar direction such that at least a portion of the diaphragm 215 overlaps the housing 235, and an extended end of the diaphragm 215 may be coupled to the housing 235.

In the speaker module 170 or 200 according to an embodiment of the disclosure, the second magnet 231 may be coupled to the housing 235 by an elastically deformable connection member 237.

In the speaker module 170 or 200 according to an embodiment of the disclosure, the diaphragm 215 may be coupled to an outer surface of the housing 235. The housing 235 may be formed of a metal material to transfer a vibration of the diaphragm 215 to the yoke plate 250.

In the speaker module 170 or 200 according to an embodiment of the disclosure, the first speaker 210 may be an air conduction speaker that is configured to emit a sound to an outside by transferring a vibration of the diaphragm 215 to the air.

In the speaker module 170 or 200 according to an embodiment of the disclosure, the second speaker 230 may be a bone conduction speaker that is configured to transfer a vibration to a user contacting the yoke plate 250.

In the speaker module 170 or 200 according to an embodiment of the disclosure, the first speaker 210 may be configured to generate a sound corresponding to a first sound range. The second speaker 230 may be configured to generate a vibration corresponding to a second sound range, which is at least partially lower than the first sound range.

An electronic device 101 according to an embodiment of the disclosure may include a first speaker 210 configured to emit a sound to an outside through a vibration of a diaphragm 215 disposed to be spaced apart from the yoke plate 250, a second speaker 230 configured to transfer a vibration to a user through the yoke plate 250 contacting the user, and at least one processor 120. For example, the electronic device 101 may contact the user or be fixed to the user through the housing 235 coupled to the yoke plate 250. The at least one processor 120 according to an embodiment may be configured to control the first speaker 210 to generate a sound corresponding to a first sound range. The at least one processor 120 according to an embodiment may be configured to control the second speaker 230 to generate a vibration corresponding to a second sound range which is at least partially lower than the first sound range.

In the electronic device 101 according to an embodiment, the at least one processor 120 is configured to filter an audio signal obtained from an outside into the first sound range and the second sound range, respectively. The at least one processor 120 may be configured to transmit the audio signal filtered into the first sound range to the first speaker 210 and transmit the audio signal filtered into the second sound range to the second speaker 230.

In the electronic device 101 according to an embodiment of the disclosure, the first speaker 210 and the second speaker 230 are positioned in a first direction of the yoke plate 250 and at least partially overlap along the first direction of the yoke plate 250.

In the electronic device 101 according to an embodiment of the disclosure, the second speaker 230 may be positioned in a center portion of the yoke plate 250. The first speaker 210 may surround or at least partially surround the second speaker 230.

In the electronic device 101 according to an embodiment, the first speaker 210 may include a first magnet 211 fixed to the yoke plate 250 and a first coil 215 fixed to the diaphragm 215 disposed between the diaphragm 215 and the yoke plate 250. The second speaker 230 may include a housing 235 coupled to the yoke plate 250 on a side of the first speaker 210 and include a second coil 233 fixed to the yoke plate 250 and a second magnet 231 positioned to be spaced apart from the second coil 233 in the housing 235 and coupled to the housing 235, which are disposed between the yoke plate 250 and the housing 235.

In the electronic device 101 according to an embodiment of the disclosure, in the second speaker 230, a cross section of at least one of the housing 235, the second coil 233 or the second magnet 231 may have a ring-shape. In the electronic device 101 according to an embodiment of the disclosure, in the first speaker 210, a cross section of at least one of the first magnet 211, the diaphragm 215, or the first coil 213 may have a ring-shape. In the electronic device 101 according to an embodiment of the disclosure, the at least one of the housing 235, the second coil 233 or the second magnet 231 is positioned concentric with the at least one of the first magnet 211, the diaphragm 215, or the first coil 213.

In the electronic device 101 according to an embodiment of the disclosure, the diaphragm 215 may extend in a planar direction such that at least a portion of the diaphragm 215 overlaps the housing 235, and an extended end of the diaphragm 215 may be coupled to the housing 235. The second magnet 231 may be coupled to the housing 235 through an elastically deformable connection member 237.

In the electronic device 101 according to an embodiment, the electronic device 101 may be a wearable device configured to be worn on the user's head with the yoke plate 250 contacting the user's head.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order), It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Storer™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A speaker module comprising:
- a yoke plate;
- a first speaker comprising:
  - a first magnet coupled to the yoke plate,
  - a diaphragm spaced apart from the yoke plate, and
  - a first coil coupled to the diaphragm; and
- a second speaker comprising:
  - a housing coupled to the diaphragm and the yoke plate, the housing being configured to transfer a vibration of the diaphragm to the yoke plate,
  - a second coil provided in the housing and coupled to the yoke plate, and
  - a second magnet spaced apart from the second coil in the housing and coupled to the housing.

2. The speaker module of claim 1, wherein the first speaker and the second speaker are provided along a first direction of the yoke plate and at least partially overlap along the first direction.

3. The speaker module of claim 2, wherein the second speaker is provided in a center portion of the yoke plate, and wherein at least one of the first magnet, the diaphragm, or the first coil at least partially surrounds the second speaker.

4. The speaker module of claim 3, wherein, in the second speaker, at least one of the housing, the second coil or the second magnet has a ring-shape in a cross-sectional view, wherein, in the first speaker, at least one of the first magnet, the diaphragm, or the first coil has a ring-shape in a cross-sectional view, and wherein the at least one of the housing, the second coil, or the second magnet is concentric with the at least one of the first magnet, the diaphragm, or the first coil.

5. The speaker module of claim 1, wherein the first magnet and the first coil are between the diaphragm and the yoke plate.

6. The speaker module of claim 1, wherein the second coil and the second magnet are between the yoke plate and the housing.

7. The speaker module of claim 6, wherein the diaphragm extends in a planar direction such that at least a portion of the diaphragm overlaps the housing, and wherein an end of the diaphragm is coupled to the housing.

8. The speaker module of claim 7, wherein the second magnet is coupled to the housing by an elastically deformable connection member.

9. The speaker module of claim 7, wherein the diaphragm is coupled to an outer surface of the housing, and
- wherein the housing comprises a metal material.

10. The speaker module of claim 1, wherein the first speaker comprises an air conduction speaker that is configured to emit a sound to an outside by transferring a vibration of the diaphragm.

11. The speaker module of claim 1, wherein the second speaker comprises a bone conduction speaker that is configured to transfer a vibration to a user that contacts the yoke plate.

12. The speaker module of claim 1, wherein the first speaker is configured to generate a sound corresponding to a first sound range, and
- wherein the second speaker is configured to generate a vibration corresponding to a second sound range that is at least partially lower than the first sound range.

13. An electronic device comprising:
- a first speaker configured to emit a sound to an outside through a vibration of a diaphragm spaced apart from a yoke plate;
- a second speaker configured to transfer a vibration to a user through the yoke plate that contacts the user; and
- at least one processor configured to:
  - control the first speaker to generate a sound corresponding to a first sound range; and
  - control the second speaker to generate a vibration corresponding to a second sound range that is at least partially lower than the first sound range,
- wherein a housing of the second speaker is coupled to the diaphragm and the yoke plate, the housing being configured to transfer a vibration of the diaphragm to the yoke plate.

14. The electronic device of claim 13, wherein the at least one processor is further configured to:
- filter an audio signal obtained from an outside into the first sound range and the second sound range;
- transmit the audio signal filtered into the first sound range to the first speaker; and
- transmit the audio signal filtered into the second sound range to the second speaker.

15. The electronic device of claim 13, wherein the first speaker and the second speaker are provided along a first direction of the yoke plate and at least partially overlap along the first direction of the yoke plate.

16. The electronic device of claim 13, wherein the second speaker is provided in a center portion of the yoke plate, and
- wherein the first speaker at least partially surrounds the second speaker.

17. The electronic device of claim 13, wherein the first speaker comprises:
- a first magnet coupled to the yoke plate; and
- a first coil coupled to the diaphragm,
- wherein the first magnet and the first coil are provided between the diaphragm and the yoke plate,
- wherein the second speaker comprises:
  - a second coil coupled to the yoke plate; and
  - a second magnet spaced apart from the second coil in the housing and coupled to the housing, and
- wherein the second coil and the second magnet are provided between the yoke plate and the housing.

18. The electronic device of claim 17, wherein, in the second speaker, at least one of the housing, the second coil, or the second magnet has a ring-shape in a cross-sectional view,
- wherein, in the first speaker, at least one the first magnet, the diaphragm, or the first coil has a ring-shape in a cross-section view, and
- wherein the at least one of the housing, the second coil, or the second magnet is concentric with the at least one of the first magnet, the diaphragm, or the first coil.

19. The electronic device of claim 17, wherein the diaphragm extends in a planar direction such that at least a portion of the diaphragm overlaps the housing,
- wherein an end of the diaphragm is coupled to the housing, and
- wherein the second magnet is coupled to the housing by an elastically deformable connection member.

20. The electronic device of claim 13, wherein the electronic device is a wearable device configured to be worn on a head of the user with the yoke plate contacting the head of the user.

* * * * *